United States Patent [19]

Bauman

[11] Patent Number: 4,563,288

[45] Date of Patent: * Jan. 7, 1986

[54] N-ALKYL ISOSTEARAMIDE ANTISTATIC AGENTS, DETERGENT COMPOSITIONS CONTAINING SUCH AGENTS, AND PROCESSES FOR WASHING LAUNDRY IN THE PRESENCE OF SUCH AGENTS, AND WITH SUCH COMPOSITIONS

[75] Inventor: Robert A. Bauman, New Brunswick, N.J.

[73] Assignee: Colgate-Palmolive Company, New York, N.Y.

[*] Notice: The portion of the term of this patent subsequent to Feb. 5, 2002 has been disclaimed.

[21] Appl. No.: 674,194

[22] Filed: Nov. 23, 1984

Related U.S. Application Data

[63] Continuation-in-part of Ser. No. 404,794, Aug. 3, 1982, Pat. No. 4,497,715.

[51] Int. Cl.4 .................. C11D 3/32; D06M 13/40
[52] U.S. Cl. ................................ 252/8.8; 252/135; 252/174.25; 252/525; 252/544; 260/404
[58] Field of Search .............. 252/8.8, 135, 525, 544, 252/174.25; 260/404

[56] References Cited

U.S. PATENT DOCUMENTS

| 3,835,148 | 9/1974 | Oxe et al. ..................... 8/490 X |
| 4,076,631 | 2/1978 | Caruso et al. .................. 252/8.8 |
| 4,497,715 | 2/1985 | Bauman ........................ 252/8.8 |

FOREIGN PATENT DOCUMENTS

| 17403 | 6/1970 | Japan . |
| 22121 | 7/1970 | Japan . |
| 22122 | 7/1970 | Japan . |
| 22521 | 7/1970 | Japan . |
| 463300 | 3/1937 | United Kingdom . |
| 2033444 | 5/1980 | United Kingdom . |

Primary Examiner—Prince E. Willis
Attorney, Agent, or Firm—Herbert S. Sylvester; Murray M. Grill; Norman Blumenkopf

[57] ABSTRACT

N-alkylisostearamides useful as antistatic agents for laundered fabrics; detergent compositions containing an effective antistatic amount of said amide; and a method of protecting fabrics against acquiring static electricity by contacting fabrics with said isostearamides or detergent compositions during laundering. These compounds provide antistatic protection without reducing optical brightener and detergency performance of the detergent composition.

20 Claims, No Drawings

N-ALKYL ISOSTEARAMIDE ANTISTATIC AGENTS, DETERGENT COMPOSITIONS CONTAINING SUCH AGENTS, AND PROCESSES FOR WASHING LAUNDRY IN THE PRESENCE OF SUCH AGENTS, AND WITH SUCH COMPOSITIONS

This application is a continuation-in-part of my co-pending application Ser. No. 404,794, filed Aug. 3, 1982, now U.S. Pat. No. 4,497,715, issued Feb. 5, 1985.

This invention relates to novel antistatic agents and detergent compositions, for use in the laundering of fabrics, containing such an antistatic agent, which is a N-alkyl isostearamide having the formula:

RCONHR', wherein RCO is derived from isostearic acid, and R' is a saturated or unsaturated aliphatic hydrocarbon chain containing 1 to 18 carbon atoms, preferably 7-18 carbons.

BACKGROUND AND PRIOR ART

The use of various and diverse chemical materials and particularly, cationic quaternary ammonium compounds, as softeners and antistatic agents for textile products, is very well known in the art. It is well known to employ such materials for their antistatic and softening effects during laundering operations and particularly in the rinse cycle of the laundering process. This latter technique has been practiced because the aforesaid quaternary compounds heretofore employed, being mainly cationic in nature, were not compatible with anionic detergents, one of the major types of detergents used in the washing cycle. Furthermore, said quaternary compounds are substantially ineffective in the presence of nonionic detergents.

It is also well known that there is a tendency for laundered articles to yellow or discolor when treated with the aforesaid quaternary compounds.

Another disadvantage associated with the use of said cationic agents in the laundering of fabrics with non-ionic detergents is an interference with the deposition on the fabrics of optical brightener, thereby reducing whitening performance of a detergent composition containing said optical brightener.

Still another disadvantage of the cationic quaternary ammonium antistatic softeners is their interference with the cleaning properties of the detergent by their reducing the soil removal effected by the detergent, resulting in decreased washing effectiveness. Also, the presence of the anionic detergent material substantially negates fabric softening properties of the cationic quaternary ammonium compounds and counteracts antistatic properties of said quaternary compounds.

Accordingly, U.S. Pat. No. 3,451,927 uses a fabric softening and antistatic composition in the water rinse during laundering, which composition comprises a cationic quaternary ammonium compound in conjunction with an alkylethanolamide.

N-alkyl fatty acid amides, wherein said alkyl radical contains 1-22 carbon atoms, are disclosed in U.S. Pat. No. 3,231,508 as foam depressants in anionic detergents; N-alkyl fatty acid amides, wherein said alkyl contains 12-18 carbon atoms, are disclosed in U.S. Pat. No. 2,691,636 as foam stabilizers in anionic detergents; N-dodecylacetamide has been used in anionic or nonionic detergent compositions as a foam enhancer, as shown in U.S. Pat. No. 2,702,278; and higher alkyl hydroxyacetamides or -butyramides have been found useful in nonionic detergents as foam improvers, as is shown in U.S. Pat. No. 3,250,719.

Mono- or diamides having the formula

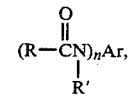

wherein R is an aliphatic straight or branched chain hydrocarbon radical having from 1 to 23 carbon atoms, R' is hydrogen or an aliphatic straight or branched chain hydrocarbon radical having 1 to 10 carbons, n is 1 or 2 and Ar is a substituted or unsubstituted aromatic radical, are used as pearling agents in shampoo compositions, as shown in U.S. Pat. No. 2,891,912.

Anionic, amphoteric and/or nonionic detergent compositions containing higher alkyl polyhydroxylated carboxamides as textile softening agents are disclosed in U.S. Pat. No. 3,654,166; and higher fatty acid monoamides of hydroxyalkylpolyamine are disclosed as textile softeners in U.S. Pat. No. 3,704,228.

Fatty amide-alkylene oxide reaction products have also been utilized as textile softening agents for laundered fabrics, as disclosed in U.S. Pat. No. 4,060,505.

N-substitued short chain carboxamides of secondary aliphatic beta amines have been used as antistatic agents in the laundering process, as shown in U.S. Pat. No. 4,283,192.

Isostearic acid, partially neutralized to a mixture of the soap and said acid, forms a stable opaque liquid conditioning shampoo, as shown in U.S. Pat. No. 3,590,122; and said combination of isostearate and isostearic acid has also been used as two components in a four component emulsifying and solubilizing composition, as described in U.S. Pat. No. 4,097,403.

An alkali metal salt of isostearic acid has been used together with a noncationic detergent in a fabric softening detergent composition, as set forth in U.S. Pat. No. 3,625,905.

Japanese patent Nos. 70/17,403, 70/22,121, 70/22,122 and 70/22,521, disclose what are referred to as isostearic amides.

However, none of aforesaid prior art discloses N-alkylisostearamides as antistatic agents, and none discloses any for such function in the presence of built or unbuilt anionic and/or nonionic detergents.

SUMMARY OF THE INVENTION

It has now been discovered that the N-alkylisostearamides of this invention are novel antistatic agents for synthetic fabrics, which may be applied to such fabrics from a washing solution without depressing the performance of the detergent or interfering with the activity of optical brighteners that may be present in the detergent composition.

OBJECTS OF THE INVENTION

Accordingly, it is a primary object of the present invention to protect fabrics against acquiring static charges during machine drying subsequent to laundering.

Another object of the present invention is to provide such protection in conjunction with conventional detergent compositions during home laundering processes.

Still another object of the present invention is to provide antistatic agents which are active in the presence of built laundry detergents.

A further object of the present invention is to provide antistatic protection without depressing detergency and without reducing optical brightener performance.

Still a further object of this invention is to provide an antistatic composition which may be employed in conjunction with detergents and other cleaning, brightening and laundering additives in a single step laundering operation.

Yet another object of the invention is to provide a method of applying to fabrics during laundering, a protective treatment against subsequent developments of static charges.

Additional objects, advantages and novel features of the invention will be set forth in the description which follows and will become apparent to those skilled in the art upon examination of this description or may be learned by practice of the invention. The objects and advantages of the invention may be realized and attained by means of the instrumentalities and combinations particularly pointed out in the appended claims.

To achieve the foregoing and other objects, and in accordance with the present invention, as embodied and broadly described herein, the antistatic composition of this invention for laundering fabrics comprises an antistatic amount of an N-alkylisostearamide represented by the structural formula:

, RCONHR' wherein RCO is derived from isostearic acid, and R' is an aliphatic saturated or unsaturated hydrocarbon chain (very preferably a primary chain, with a primary carbon thereof on the amide nitrogen) containing 1 to 18 carbons; and the method of imparting antistatic properties to fabrics comprises treating fabrics with a composition containing an antistatic amount of said N-alkylisostearamide in the wash cycle of the laundering process, either as a separate additive or premixed with the detergent. More specifically, antistatic properties are imparted to fabrics by laundering the fabrics in a composition containing a detergent, preferably anionic or nonionic, one or more of the above-defined N-alkylisostearamides, and other ingredients, such as builders, optical brighteners, enzymes, bleaches, and other conventional additives.

More specifically, the present invention relates to N-alkylisostearamides as antistatic agents to be used in the wash cycle of the laundering of fabrics; and to antistatic compositions for laundering fabrics, comprising said antistatic agent, detergent(s) selected from the group consisting of anionic, nonionic and amphoteric surfactants and mixtures thereof, and preferably, builder salts and optical brighteners. The method of imparting antistatic properties to fabrics during laundering comprises treating said fabrics during the wash cycle with said antistatic N-alkylisostearamide(s).

The present N-alkylisostearamides, wherein the alkyl group contains 1-18 carbon atoms derived from a saturated or unsaturated primary amine, reduce or prevent the generation of static electricity on cotton and synthetic fabrics during laundering. These antistatic properties can be imparted to fabrics by laundering them in a detergent composition containing said isostearamide(s), which are completely compatible with anionic, nonionic and amphoteric detergents, or by the separate addition of said antistatic agent(s) to the wash cycle during laundering. This same treatment has been found additionally to confer a soft hand to cotton fabrics and does not depress detergency of the detergent composition. These beneficial effects are achieved without yellowing or discoloration of the fabrics and without interference with the action of optical brighteners that may be present in the detergent composition. These N-alkylisostearamides are not pH sensitive, thereby enabling their uses together with built detergents. Among the novel compounds of this invention which are useful antistatic agents to render antistatic laundry washed in the presence of such amides are cocoalkyl isostearamide, tallowalkyl isostearamide and hydrogenated tallowalkyl isostearamide.

The N-alkylisostearamides of the present invention can generally be prepared by the conventional methods for amide synthesis. Isostearic acid is converted to the corresponding acid chloride by reaction with thionyl chloride, which acid chloride is added to a primary amine, dissolved in a solvent such as water, ether or methylene chloride, to form the amide. The amide is isolated as a viscous liquid or waxy solid depending on the molecular weight. The infrared spectrum absorption curve shows absorptions at 3.05, 6.1, and 6.5 microns, which are characteristic of secondary amides.

More specifically, the present N-alkylisostearamides are prepared from known starting materials by means of a two-step process, first converting isostearic acid, which is a mixture of branched-chain isomer of stearic acid of the formula $C_{17}H_{35}COOH$, having primarily methyl branching, to the isostearoyl chloride by reacting with thionyl chloride, and then reacting said resulting isostearoyl chloride with a primary aliphatic amine containing 1 to 18 carbons. These reactions may be represented by the following equations, wherein R and R' are as aforedefined:

$$RCOOH + SOCl_2 \xrightarrow{\text{dimethyl formamide}} RCOCl + HCl + SO_2 \qquad 1.$$

$$RCOCl + R'NH_2 \longrightarrow RCONHR' + HCl \qquad 2.$$

The conversion of the isostearic acid to the isostearoyl chloride is preferably conducted in the presence of dimethyl formamide, which acts as a catalyst in this reaction. Since the amide reaction is exothermic, cooling may be desirable in order to control the temperature. This reaction is preferably conducted in the presence of any non-reactive solvent, such as water, methylene chloride, methyl or ethyl ether, benzene, chloroform or the like, and in the presence of any tertiary amine such as trimethyl amine, pyridine and preferably triethylamine, which reacts with the acid byproduct formed during this reaction. The reaction mixture may be washed successively with water or alcohol-water mixtures, dilute acid and water to remove any unreacted starting material, and may be dried over $Na_2SO_4$ or similar neutral salt. The solvent is removed, preferably by evaporating in vacuum. The resultant N-alkylisostearamides are liquids, oils or solids.

The following examples illustrate the manner in which compounds of this invention are prepared, but the invention is not limited thereto. Unless otherwise

EXAMPLE 1

Preparation of N-Propylisostearamide
($RCONHCH_2CH_2CH_3$, wherein R is a complex mixture of branched isomers of stearic acid)

14 G (0.05 mole) of isostearic acid (Emersol 871, sold by Emery Industries) and 6.5 g (0.055 mole) of thionyl chloride are mixed under nitrogen gas, and 0.1 ml of dimethyl formamide (catalyst) is added. This mixture is stirred for 20 minutes on a warm water bath, charged with $N_2$ and stirred another 10 minutes. Infrared spectra readings show some acid peaks still present. An additional 0.5 g of thionyl chloride is added and the mix is stirred another ten minutes. Infrared readings show negligible acid peaks. The resultant product is isostearoyl chloride.

This isostearoyl chloride is added to 7 g (0.12 mole) of n-propylamine in 70 ml ether, the mix is stirred in an ice bath, and the mix is stirred another 10 minutes at room temperature. The amide is extracted with ether, washed twice with water, twice with 5% HCl, and again with water until neutral, dried over $Na_2SO_4$ and evaporated in vacuum to 14 g of a light amber liquid. Infrared spectra bands show absorptions at 3290, 3076, 1645 and 1546 $cm^{-1}$, typical of secondary amides.

EXAMPLE 2

Preparation of N-Methylisostearamide

Isostearoyl chloride, which is prepared according to the procedure of Example 1, is added to 15 ml of 40% methylamine in 50 ml water and the mix is stirred in an ice bath. The reaction mixture is then stirred 15 minutes at room temperature, extracted with ether, washed twice with a 5% HCl solution, and then with water, until neutral. Infrared spectra readings are typical of a secondary amide.

EXAMPLE 3

Preparation of N-Octylisostearamide

Isostearoyl chloride, prepared from 20 g isostearic acid, 10.1 g thionyl chloride and 0.2 ml dimethyl formamide, according to the procedure of Example 1, is added to 11 g (0.09 mole) n-octylamine and 10 g (0.10 mole) trimethylamine in 100 ml ether. The reaction mixture is treated in accordance with the procedure of Example 2, yielding 22 g of an amber oil, which exhibits infrared spectra values typical of a secondary amide.

EXAMPLE 4

Preparation of N-Cocoalkylisostearamide

256 G (0.9 mole) isostearic acid, 128 g (1.08 mole) thionyl chloride and 4.5 ml dimethylformamide are placed in a flask surrounded by a warm water bath, and stirred under $N_2$ for ½ hour. At this time an infrared spectrum indicated no unreacted acid. The HCl formed in this reaction is blown out with $N_2$. After ½ hour, the reaction mixture is heated in a vacuum to remove excess thionyl chloride, and is distilled to recover the isostearoyl chloride, which is collected at 140°–150° C. and 0.2 mm pressure, giving a yield of 242 g (89% of theory).

A part of the isostearoyl chloride (54 g) is added in about 25 minutes to 37 g cocoamine ($C_{10}$–$C_{14}$), 250 ml methylene chloride and 25 ml triethylamine, while maintaining the temperature below 25° C. After complete addition of the isostearoyl chloride, the mixture is stirred at room temperature for ½ hour. The reaction mixture is transferred to a separatory funnel and is washed twice with a 25% alcohol-water mixture, then washed twice with 5% HCl and again twice with the alcohol-water mixture until neutral to pH test paper. The reaction product is dried over $Na_2SO_4$ and evaporated on a rotary evaporator to 79 g of a thick oil, which is cocoisostearamide. The infrared spectrum shows strong absorptions at 3280, 1642 and 1548 $cm^{-1}$, typical of secondary amide.

EXAMPLE 5

Preparation of Hydrogenated Tallowisostearamide

Isostearoyl chloride is prepared from 56 g (0.2 mole) isostearic acid, 25 g (0.21 mole) thionyl chloride, 1 ml dimethylformamide (0.014 mole) and 50 ml methylene chloride (solvent for the reaction), by stirring the mixture, without heat or cooling, for ½ hour, and for another ½ hour on a warm water bath. Infrared spectra readings show no carboxylic absorption, indicating completion of the reaction. The amount of the isostearoyl chloride recovered is 70 g.

35 G of the aforesaid isostearoyl chloride are added to 27 g hydrogenated tallow amine, 11 g triethylamine and 150 ml methylene chloride. The resultant N-tallowisostearamide is washed twice with a 25% alcohol-water mixture, washed once with a water solution containing 25% ethanol and 5 ml concentrated HCl, and again with the 25% alcohol water mixture until neutral, is filtered and dried over $Na_2SO_4$.

Other aliphatic primary amines may be used in the preparation of the present N-alkylisostearamide antistatic agents, such as saturated or unsaturated ethyl, butyl, hexyl, nonyl, decyl, dodecyl, tetradecyl, hexadecyl, heptadecyl and octadecyl amines and mixtures thereof.

Secondary amines such as N,N-diethylamine yield tertiary isostearamides such as N,N-diethylisostearamides, which exhibit very limited effect on static, compared to the secondary isostearamides of present invention.

It has been additionally found that isostearamides of amines from heptyl to octadecyl are superior to those with shorter chains; that the isostearamides are efficacious in detergents built with NTA (nitrilotriacetate) or zeolite, as well as tripolyphosphate; that there is an insignificant loss in detergency; and that there is no adverse effect on the deposition of optical brightener. The N-alkylisostearamides of this invention function equally well in unbuilt and built detergent systems.

The antistatic compounds of this invention may be used in conjunction with detergents which include anionic detergents, such as alkylbenzene sulfonic acid and its salts, e.g., compounds of the formula alkyl-phenyl-$SO_3$-M, wherein the alkyl is of $C_8$ to $C_{22}$ (preferably $C_{10}$ to $C_{18}$) and M is hydrogen or an alkali metal, which compounds comprise a well-known class of anionic detergents and include sodium dodecylbenzene sulfonate, potassium dodecylbenzene sulfonate, sodium laurylbenzene sulfonate and sodium cetylbenzene sulfonate. Other anionic detergents are paraffin sulfonates, alkyl sulfates, alcohol ether sulfates, olefin sulfonates and the alkylphenolethoxylate sulfates, e.g., sodium dinonylphenoxynonaethoxyethanol sulfate, sodium dodecylhexadecaethoxyethanol sulfate, and other equivalent water soluble salts, particularly alkali metal salts.

Among the above-noted alkylbenzene sulfonic acids and salts thereof the preferred compounds include those which are biodegradable and which are particularly characterized by a linear alkyl substituent of from $C_{10}$ to $C_{22}$ and preferably from $C_{12}$ to $C_{15}$. It is, of course, understood that the carbon chain length represents, in general, an average chain length since the method for manufacturing such products usually employs alkylating reagents of mixed chain length. It is clear, however, that substantially pure olefins, as well as alkylating compounds used in other techniques, can and do give alkylated benzene sulfonates wherein the alkyl moiety is substantially, i.e., at least 99%, of one chain length, i.e., $C_{12}$, $C_{13}$, $C_{14}$, or $C_{15}$. The linear alkyl benzene sulfonates are further characterized by the position of the benzene ring in the linear alkyl chain, with any of the position isomers (i.e., alpha to omega) being operable and contemplated.

In addition to the higher alkyl substituted benzene sulfonates one may also employ the higher alkyl substituted lower alkyl ($C_1$ to $C_4$) analogs of benzene such as such substituted toluene, xylene, trimethyl benzenes, ethyl benzene, isopropyl benzene and the like. The sulfonates are generally employed in the water soluble salt form which includes, as the cation, alkali metal, ammonium, lower amine and lower alkanolamine.

Examples of suitable linear alkyl benzene sulfonates include:
sodium n-decyl benzene sulfonate,
sodium n-dodecyl benzene sulfonate,
sodium n-tetradecyl benzene sulfonate,
sodium n-pentadecyl benzene sulfonate, and
sodium n-hexadecyl benzene sulfonate,
and the corresponding higher alkyl sulfonates of lower alkyl substituted homologues of benzene, as well as the salts in which the cations are those previously mentioned. Mixtures of these sulfonates may, of course, also be used, which mixtures may include compounds wherein the linear alkyl chain is smaller or larger than indicated herein, provided that the average chain length in the mixture is within the $C_{10}$ to $C_{22}$ range.

The linear paraffin sulfonates also constitute a well known group of detergent compounds and include water soluble salts (alkali metal, amine, lower alkanolamine, and ammonium) of:
2-decanesulfonic acid,
2-dodecanesulfonic acid,
2-tridecanesulfonic acid,
2-tetradecanesulfonic acid,
2-pentadecanesulfonic acid, and
2-hexadecanesulfonic acid,
as well as the other position isomers (with respect to the sulfonic acid group).

In addition to the paraffin sulfonates illustrated above, others with the alkyl in the general range of $C_{10}$ to $C_{22}$ may be used, with the most preferable range being from $C_{12}$ to $C_{20}$.

The linear alkyl sulfates which are contemplated in this invention are those in which the alkyl is in the range of $C_{10}$ to $C_{20}$. Specific examples include: sodium n-decyl sulfate; sodium n-dodecyl sulfate; sodium n-hexadecyl sulfate; sodium n-heptadecyl sulfate; sodium n-octadecyl sulfate; the ethoxylated (1 to 100 moles ethylene oxide) derivatives thereof; and, of course, other water soluble salts containing other salt forming cations, as mentioned above.

Included in the group of anionic detergents, which have been described above as suitable in the present invention, are the olefin sulfonates, including long chain alkene sulfonates and long chain hydroxyalkane sulfonates, as well as disulfonates. Examples of suitable olefin sulfonates, which are merely illustrative of the general class, are sodium dodecene-1 sulfonate, sodium tetradecene-1 sulfonate, sodium hexadecene-1 sulfonate and sodium octadecene-1 sulfonate.

Also useful in conjunction with the present antistatic isostearamides are nonionic detergents, which are commercially known and include the primary aliphatic alcohol ethoxylates, secondary aliphatic alcohol ethoxylates, alkylphenol ethoxylates and the alcohol ethylene oxide-propylene oxide condensates such as Plurafacs ® (Wyandotte), and mixtures thereof. The nonionic synthetic organic detergents are generally condensation products of an organic aliphatic or alkyl aromatic hydrophobic compound and hydrophilic ethylene oxide groups. Practically any hydrophobic compound having a carboxy, hydroxy, amido, or amino group with a free hydrogen attached to the nitrogen can be condensed with ethylene oxide or with the polyhydration product thereof, polyethylene glycol, to form a nonionic detergent. Further, the length of the polyethenoxy chain can be adjusted to achieve the desired balance between the hydrophobic and hydrophilic elements.

The nonionic detergents include the polyethylene oxide condensations of one mole of alkyl phenol, containing from about 6 to 12 carbon atoms in a straight- or branched chain alkyl configuration, with about 5 to 30 moles of ethylene oxide, for example, nonyl phenol condensed with 9 moles of ethylene oxide, dodecyl phenol condensed with 15 moles of ethylene oxide and dinonyl phenol condensed with 15 moles of ethylene oxide. Condensation products of the corresponding alkyl thiophenols with 5 to 30 moles of ethylene oxide are also suitable.

Also included in the nonionic detergent class, and often preferred, are the condensation products of a higher alcohol, e.g., an alkanol containing about 8 to 18 carbon atoms in a straight or branched chain configuration, condensed with about 5 to 30 moles of ethylene oxide, for example, lauryl-myristyl alcohol condensed with about 16 moles of ethylene oxide.

A preferred group of nonionic surfactants are the Neodol ® ethoxylates (Shell Co.), which are higher aliphatic alcohol ethoxylates having about 5 to 20 ethyleneoxy groups per mole of aliphatic alcohol containing about 10–18 carbon atoms, such as $C_{12-13}$ alkanol condensed with 6.5 moles of ethylene oxide, $C_{12-15}$ alkanol condensed with 12 moles of ethylene oxide, $C_{14-15}$ alkanol condensed with 13 moles of ethylene oxide, and the like (alkanols preferably being fatty).

In addition to the anionic and nonionic detergents which may be employed in conjunction with the antistatic agents of the present invention, amphoteric detergents are also useful. Representative of those compounds which may be employed in conjunction with the instant fabric antistatic compounds are the carboxy- and sulfo-betaines.

The amount of detergent may comprise from about 5–75% by weight of the total composition and usually will be from about 15–45% by weight thereof.

The composition of the instant invention may also include, in addition to the instant antistatic compounds and conventional anionic, nonionic and amphoteric detergents, builders, brighteners, hydrotropes, germicides, soil suspending agents, antiredeposition agents, antioxidants, bleaches, coloring materials (dyes and pigments), perfumes, water soluble alcohols, foam boosters, non-detergent alkali metal benzene sulfonates, etc.

The builder is usually a water-soluble, inorganic salt which may be a neutral salt or an alkaline builder salt, such as one or more of the phosphates, silicates, bicarbonates, carbonates, citrates and borates. Preferably the builder will be one of those compounds characterizable as condensed phosphates, such as polyphosphates and pyrophosphates, or an alkali citrate. Specific examples of alkaline salts are the tripolyphosphates, tetrasodium pyrophosphate, pentasodium tripolyphosphate (either Phase I or Phase II), sodium hexametaphosphate, and the corresponding potassium salts of these compounds, sodium and potassium silicates, e.g., sodium metasilicate and other silicates (e.g., 1 $Na_2O$: 1.6-3 $SiO_2$), sodium carbonate, potassium carbonate, mixed sodium and potassium bicarbonate, sodium citrate and potassium citrate. Other such salts may also be used wherein the compounds are water soluble, including the general class of alkali metal, alkaline earth metal, amine, alkanolamine and ammonium salts.

Other builders which are salts of organic acids may also be used, and in particular the water-soluble (alkali metal, ammonium, substituted ammonium and amine) salts of aminopolycarboxylic acids such as:
ethylene diamine tetraacetic acid,
nitrilotriacetic acid,
diethylene triamine pentaacetic acid,
N-(2-hydroxyethyl)-ethylene diamine triacetic acid
2-hydroxyethyl-iminodiacetic acid and
1,2-diaminocyclohexane diacetic acid, and the like.

Sodium sulfate may be considered to be a neutral builder salt but is preferably characterized as a filler salt, instead.

Water insoluble builders having cation exchange properties may also be used, such as the sodium aluminosilicate, for example, Zeolite A, preferably as the 4A hydrate, which may be used alone or in combination with other builders, such as sodium tripolyphosphate.

The amount of builder salts may comprise from about 5-75% by weight of the total composition which may be in liquid or solid form, and usually the weight proportion will be about 20-70%.

In addition to compositions comprising the N-alkylisostearamide antistatic agents of the instant invention, in combination with detergent(s) and conventional laundering additives, it is noted that said antistatic agents may be formulated in suitable absorbent carriers for addition to the wash cycle of the laundering process with the concomitant addition of detergent materials. In such application said amide may be dispersed into, and/or absorbed onto an absorbent carrier for addition to the laundering cycle such as, for example, a carrier selected from the group consisting of: phosphate; borax; silicates, such as Microcel C (synthetic calcium silicate by Johns Manville); bentonite clays, such as Mineral Colloid 101, formerly Thixo-Jel No. 1 (Georgia Kaolin Co.) ; a phosphate base bead comprising 37.5% tripolyphosphate, 14.5% sodium silicate, dye, brightener and water, which has been spray dried; a carbonate base bead comprising a spray dried composition containing 49% sodium bicarbonate, 10.67% sodium carbonate, 17% silicate solids, color and water; and mixtures thereof. The base bead or powder is mixed with the liquid or melted (if normally solid) isostearamide until said amide is dispersed into and/or absorbed onto said base bead. The preferred carrier is Microcel C, having said isostearamide dispersed in it.

The amount of amide utilized in connection with detergent compositions is generally considered to be a relatively small proportion, as compared to the weight of the active ingredients therein. It is noted, however, that one need only employ an effective amount of said amide which, in fact, produces the desired antistatic action on fabrics. It is preferred that said amide be present in an amount from about 2% to about 25%, preferably 5% to 20% of the total ingredients present in the detergent composition, on a weight basis, so that the concentration in the wash solution will be in the range of 0.002-0.02%. Increased amounts of the amide decrease the static generated on the fabric during tumble drying or wear.

The composition of the instant invention may be employed in particulate, liquid, tablet, or any other conventional form. Moreover, as noted above, the secondary isostearamides, as disclosed herein, may be employed as antistatic fabric agents by being applied to said fabrics during the wash cycle of the washing process, or they may be premixed with the detergent materials.

The laundering and antistatic compositions of the present invention and the method of treating fabrics therewith will now be illustrated by the following more detailed examples thereof. It is noted, however, that these examples are merely illustrative of the invention, which is not to be construed as limited thereto.

EXAMPLES 6-9

20 G of Neodol ® 23-6.5[1] are added to a washing machine while it is being filled with 65 liters of water at 120° F. After 1 minute, 3 g of the isostearamide are added. After another minute the four fabrics, Dacron (D), nylon (N), Dacroncotton (D/C) and acetate (Ac) are added. The fabrics are washed for 14 minutes, rinsed with cold water and tumble dried.

A qualitative measure of the static protection conferred on the fabrics is the presence or absence of static and cling upon removal from the dryer. A more quantitative measure is obtained by determining the charge (in kilovolts) produced on each fabric when it is rubbed for 5 seconds with wool at low humidity; the sum of the absolute values of the charges on each fabric is a convenient measure of antistatic protection, with a low number being best protection (lowest charge). [1]Ethoxylated $C_{12-13}$ aliphatic alcohol having an average of 6.5 moles ethylene oxide (Shell Co.)

| Ex. | Isostearamide | Dryer Static | Dacron pickup (g, 2 runs) | Static (Kilovolts) | | | | Sum (Sign Ignored) |
|---|---|---|---|---|---|---|---|---|
| | | | | D | N | D/C | Ac | |
| 6 | Methyl | Slight | .24, .32 | −.8 | −.7 | −6.8 | +4.0 | 12 |
| 7 | Propyl | None | .58, .48 | −.6 | +2.6 | −7.6 | +4.5 | 15 |
| 8 | Octyl | None | .70, .67 | −.65 | ±.9 | −4.3 | +2.8 | 9 |
| 9 | Diethyl | Yes | .13, .10 | −.5 | +5.2 | −9.5 | +4.5 | 20 |

N-octylisostearamide is the best of the four. The least effective is the diethyl isostearamide.

These results show the superiority of the higher alkylisostearamide (8 carbon chain) over the lower alkyl isostearamides as antistatic agents in the wash cycle during laundering with unbuilt nonionic detergents. The tertiary isostearamide, diethylisostearamide, has lowered antistatic activity. The Dacron pickup value is indicative of the substantivity of the amides to the fabric.

EXAMPLES 10–13

The procedure of Examples 6–9 is repeated, using octylisostearamide antistatic agent in the absence (Examples 10 and 11) and presence (Examples 12 and 13) of 30 g of sodium tripolyphosphate salt, said salt also being added to the washing machine along with the Neodol detergent during the wash fill.

| Ex. | Wash Water pH (2 tests) | Dryer Static | Dacron Pickup (g) Two Runs | Static Test (Kilovolts) | | | | Sum (Sign ignored) |
| --- | --- | --- | --- | --- | --- | --- | --- | --- |
| | | | | D | N | D/C | Ac | |
| 10, 11 | 8.0, 7.8 | no | 1.18, 0.78 | −.11 | −0.7 | −3.0 | +3.6 | 7 |
| 12, 13 | 8.8, 8.9 | no | 0.70, 0.53 | −.15 | −1.6 | −4.5 | +1.2 | 7 |

From the above data it is seen that the isostearamide works equally well as an antistat in unbuilt and tripolyphosphate built systems.

EXAMPLES 14–18 a, b, c, and d

| Phosphate-built Anionic Detergent | |
| --- | --- |
| Ingredient | % |
| Sodium tridecyl benzenesulfonate | 15 |
| Nonionic Detergent* | 0.5 |
| Sodium silicate (Na$_2$O:SiO$_2$ = 1:2.4) | 10.5 |
| Sodium tripolyphosphate | 33 |
| Sodium carbonate | 5 |
| Sodium sulfate | 24 |
| Sodium carboxymethylcellulose | 0.25 |
| Optical brighteners | 0.5 |
| Borax | 1.0 |
| Perfume | .15 |
| Water | 10.1 |
| | 100.0 |

*Ethoxylated fatty alcohol (C$_{12-15}$) with average of 7 moles ethylene oxide

EXAMPLE 15

This composition may be modified to contain 20% of zeolite and a reduced phosphate salt content.

EXAMPLE 16

The composition of Example 14 may be modified to contain 20% of Thixo-Jel (bentonite clay) softener and a reduced amount of phosphate salt.

EXAMPLE 17

The composition of Exampole 15, wherein the phosphate builder is replaced with nitrotriacetate salt.

EXAMPLE 18

The composition of Example 14 may be modified to replace the phosphate builder with sodium carbonate.

These compositions are spray dried to produce powders, which are effectively antistatic.

To each composition are added 2–10 g of one of the following amide antistatic agents and mixing is effected by any suitable means, using rotation and/or agitation, with or without heat, and antistatic products result.
a. N-decylisostearamide;
b. N-octylisostearamide;
c. N-cocoisostearamide; and
d. N-tallowisostearamide.

EXAMPLES 19, 20 and 20 a, b, c and d

EXAMPLE 19-Built Nonionic Detergent

| Ingredient | % |
| --- | --- |
| Ethoxylated alcohol* | 19 |
| Sodium tripolyphosphate | 60 |
| Sodium silicate (Na$_2$O:SiO$_2$ = 1:2.4) | 10 |
| Optical brightener | 2 |
| Enzyme (proteolytic) | 1.5 |
| Perfume and color | 0.35 |
| Moisture | 7.15 |

*Fatty alcohol (C$_{12-13}$) condensed with an average of 6.5 moles of ethylene oxide.

EXAMPLE 20

The composition of Example 19 may be modified by replacing part, e.g., ⅔, of the tripolyphosphate with sodium nitrilotriacetate salt. To 40 g of this formulation, which is in the form of a powder, are added 2–10 g of a fabric antistat, as follows:
a. N-decylisostearamide;
b. N-octylisostearamide;
c. N-cocoisostearamide; and
d. N-tallowisostearamide.

EXAMPLES 21 a, b, c and d

Anionic/nonionic Detergent

| Ingredient | % |
| --- | --- |
| Ethoxylated alcohol* | 34.0 |
| Dodecylbenzene sulfonate | 8.5 |
| Ethanol | 6.5 |
| Triethanolamine | 0.5 |
| Sodium formate | 1.5 |
| Perfume | 0.5 |
| Optical brightener | 0.6 |
| Color | 0.3 |
| Water | 47.6 |

*Fatty alcohol (C$_{12-12}$) condensed with an average of 6.5 moles of ethylene oxide When 60 g of this liquid formulation are used in the washing machine, 2–10 g of antistatic agent are also added:
a. N-decylisostearamide;
b. N-octylisostearamide;
c. N-cocoisostearamide; and
d. N-tallowisostearamide.

All such detergents are noticeably antistatic.

EXAMPLE 22

The efficacy of N-decylisostearamide as an antistatic agent in a typical tripolyphosphate-built anionic laundry detergent is tested by laundering a mixed fabric load (polyester, nylon, acetate and polyester-cotton blend) with 100 g of the composition of Example 14 a, to which has been added 0, 2, 4 or 6 g of N-decylisostearamide (employing Whirlpool washers and 65 liters of tap water at 120° F.). Static protection is quantified by measuring the charge developed on each of the dry fabrics by rubbing with wool in a controlled manner for 5 seconds. The absolute values of these charges are summed to produce a Static Value; the smaller the number, the greater the static protection. The results of 10 duplicate experiments are tabulated.

| G N—decylisostearamide | Static Values |
| --- | --- |
| 0 | 37, 33 |
| 2 | 17, 17 |
| 4 | 10, 11 |
| 6 | 7, 7 |

This example clearly establishes antistatic properties of the isostearamides of this invention, in amounts as low as about 2% by weight of the detergent composition, with increasing amounts of the amide decreasing the static generated.

The utility of the amides in reducing static electricity is shown in Table 1, with rest runs (Examples 23–49) in which different fabrics are washed in Whirlpool washers (65 liters tap water at 120° F.) with a mixed clean fabric load (cotton terry, Dacron ® double knit, Banlon ® nylon and Dacron/cotton 65/35), and are tumble dried. In each case, 3-6 g of the test material are premixed with 95–100 g of anionic detergent or 40 g of nonionic detergent and the resulting composition is then added to the wash cycle of the laundering process.

The static value is the sum of the absolute values of the surface charges of the four fabrics upon their removals from the dryer, with the lower values being better (less static).

TABLE 1

| Example No. | Detergent Composition | Amide (weight and type) | Dryer Static (Y/N) | Static Value (kilovolts) |
| --- | --- | --- | --- | --- |
| 23 | Ex. 14 | — | yes | 43, 40 |
| 24 | Ex. 14 | 3 g decyl | no | 11 |
| 25 | Ex. 14 | 3 g coco | no | 14 |
| 26 | Ex. 14 | 6 g coco | no | 7 |
| 27 | Ex. 14 | 3 g tallow | no | 13 |
| 28 | Ex. 14 | 6 g tallow | no | 15 |
| 29 | Ex. 15 | — | yes | 47 |
| 30 | Ex. 16 | — | yes | 59, 47 |
| 31 | Ex. 15 | 5 g coco | no | 10 |
| 32 | Ex. 16 | 5 g coco | no | 27 |
| 33* | Ex. 14 | 5 g octyl | no | 9 |

TABLE 1-continued

| Example No. | Detergent Composition | Amide (weight and type) | Dryer Static (Y/N) | Static Value (kilovolts) |
| --- | --- | --- | --- | --- |
| 34* | Ex. 15 | 5 g octyl | no | 6 |
| 35* | Ex. 16 | 4 g octyl | no | 23 |
| 36* | Ex. 16 | 4 g coco | no | 19 |
| 37* | Ex. 16 | 6 g octyl | no | 19 |
| 38* | Ex. 16 | 6 g coco | no | 14 |
| 39* | Ex. 14 | 4 g coco | no | 12 |
| 40* | Ex. 16 | 4 g coco | no | 26 |
| 41* | Ex. 15 | 4 g coco | no | 13 |
| 42* | Ex. 17 | 4 g coco | no | 19 |
| 43** | Ex. 14 | 4 g coco | no | 14 |
| 44** | Ex. 14 | 4 g octyl | no | 13 |
| 45 | Ex. 19 | — | yes | 42 |
| 46 | Ex. 19 | 3 g coco | no | 25 |
| 47 | Ex. 19 | 5 g coco | no | 24 |
| 48 | Ex. 19 | 5 g tallow | no | 15 |
| 49 | Ex. 14 | 5 g tallow added separately, not mixed | no | 11 |

*The isostearamide is spread evenly over the inner surface of a 2 liter flask. The detergent composition is added to the flask and the flask is rotated in a hot water bath. The flask walls are scraped down once and the flask is again rotated until all of the isostearamide is dispersed, affording a more even dispersion.
**The isostearamide is dispersed with 94 g of detergent composition, without heat.

Octyl, decyl, coco and tallow isostearamides, premixed with built anionic or nonionic detergents, are all effective antistatic agents.

By incorporating a bentonite clay as well as an isostearamide into a phosphate built anionic detergent the fabric softening effect of the former is obtained as well as the antistatic effect of the latter (see Examples 32, 35, 36, 37, 38 and 40).

The particular detergent composition utilized can affect the antistatic properties of the isostearamide, with the phosphate built anionic detergent and the phosphate-zeolite built anionic detergent both being more effective than the nitrilotriacetate built anionic detergent, which is more effective than the phosphate/Thixo-Jel anionic detergent, (Examples 39–42). The isostearamide dispersed in built nonionic detergent has less antistat effectiveness, with inactivation apparently being due to its intimate contact with the nonionic surfactant (Example 46, 47 and 48).

The isostearamide may be added to, dispersed in and/or absorbed onto a suitable absorbent substrate such as phosphate base beads, Microcel C or a fabric, such as a terry towel, or may be distributed on the surface of a particulate detergent composition.

Table II shows the results (Examples 50–62) of the separate additions to the washer of 5 g of antistatic agent on various substrates, concomitantly with 100 g of detergent.

TABLE II

| Example No. | Detergent Composition | Isostearamide (type) | Substrate Type | Static Value (Kilovolts) |
| --- | --- | --- | --- | --- |
| 50 | Ex. 18 | coco | 10 g phosphate base beads | 12 |
| 51 | Ex. 14 | coco | 8.8 g piece of towel | 10 |
| 52 | Ex. 14 | tallow | 8.8 g piece of towel | 10 |
| 53 | Ex. 14 | coco | 10 g phosphate base beads | 14 |
| 54 | Ex. 14 | tallow | 10 g phosphate base beads | 12 |
| 55 | Ex. 14 | coco | 4 g Microcel C | 9 |
| 56 | Ex. 14 | tallow | 4 g Microcel C | |
| 57 | Ex. 14 | coco | 10 g detergent | 13 |
| 58 | Ex. 14 | tallow | 10 g detergent | 17 |
| 59 | 40 g Ex. 19 | coco | 4 g Microcel C | 15 |

TABLE II-continued

| Example No. | Detergent Composition | Isostearamide (type) | Substrate Type | Static Value (Kilovolts) |
|---|---|---|---|---|
| 60 | 40 g Ex. 20 | coco | 3 g Microcel C | 13 |
| 61 | Ex. 18 | coco | 3 g Microcel C | 12 |
| 62 | 60 g Ex. 21 | coco | 3 g Microcel C | 15 |

EXAMPLES 63–65

Infrared analysis of the materials deposited on the Dacron fabric during laundering, and recovered by ether extraction, shows it to be only coco isostearamide. Therefore, coco isotearamide does not cause codeposition of surfactant.

The non-interference of coco isostearamide with detergency was shown by the data obtained after laundering standard soiled switches (Test Fabrics nylon, Test Fabrics cotton, clay on cotton, clay on polyester-cotton and EMPA 101) with 100 g of anionic detergent (Example 14) with and without the addition of 5 g of coco isostearamide adsorbed on 4–5 g Microcel C. Clean synthetic fabric swatches were included to insure that antistatic effectivenesss was achieved.

| Example No. | Coco Isostearamide (weight) | Dryer Static | Static Value (kilovolts) | Reflectance of Soiled Swatches After Wash (units) | | | | |
|---|---|---|---|---|---|---|---|---|
| | | | | TFN | TFC | CC | C-PC | EMPA |
| 63 | 0 | Heavy | 38 | 62.2 | 45.1 | 62.2 | 85.7 | 27.1 |
| 64 | 5 g | None | 9 | 63.0 | 44.7 | 66.8 | 85.5 | 31.1 |
| 65 | 5 g | None | 10 | 61.2 | 45.8 | 65.7 | 85.3 | 28.9 |

Other useful carriers or substrates for the isostearamides include puffed borax, soda ash, granular sodium tripolyphosphate, granular sodium pyrophosphate and other suitable absorbent carriers, preferably in a weight ratio of about 1–5 g of isostearamide to 1.5–10 g of substrate.

The method of incorporating the isostearamides into detergents affects the antistatic results to an extent. This accounts for variations in performance from one experiment to another, using the same components. The preferred form is the isostearamide dispersed on Microcel C (a synthetic calcium silicate), as a separate additive to the washer during the wash cycle of the laundering process.

Using concentrations from 7.5 to 240 p.p.m., the compounds of this invention have no significant effect on overall detergency of the soiled swatches, cause no loss in brightener efficiency and cause no significant yellowing of nylon or cotton, in contrast to an equal weight of a quaternary ammonium type antistatic agent, which was deficient in all these areas.

The ability of the secondary N-alkylisostearamides to reduce static electricity in the presence of both anionic and nonionic detergents and mixtures thereof, either built or unbuilt, has been clearly shown with respect to the compositions of Examples 14–21.

It is understood that the foregoing detailed description is given by way of illustration only and that variations may be made therein without departing from the invention. The "Abstract" given is for convenience of technical searchers and is not to be given any weight with respect to the scope of the invention.

What is claimed is:

1. Antistatic compounds of the formula:

RCONHR' wherein RCO is an acyl of isostearic acid and R' is selected from the group consisting of cocoalkyl, tallowalkyl and hydrogenated tallowalkyl, and mixtures thereof.

2. A compound according to claim 1, which is tallowalkyl isostearamide.

3. A compound according to claim 1, which is coco alkylisostearamide.

4. A compound according to claim 1, which is hydrogenated tallow isostearamide.

5. A compound according to claim 1, which is decyl isostearamide.

6. An antistatic detergent composition for laundering fabrics comprising an effective antistatic amount of the isostearamide antistatic compound of claim 1 and a detersive proportion of a detergent selected from the group consisting of anionic, nonionic and amphoteric detergent materials.

7. An antistatic detergent composition according to claim 6 comprising about 2–25% by weight of the amide antistatic agent.

8. A composition according to claim 7 comprising optical brightener(s) and builder(s).

9. A composition according to claim 6 wherein the detergent is an anionic synthetic organic detergent and the antistatic agent is about 2–25% by weight of the composition.

10. A composition according to claim 9, comprising optical brightener(s) and builder(s).

11. An antistatic composition for use in the wash cycle of fabric laundering processes comprising an effective antistatic proportion of the isostearamide antistatic agent of claim 1 dispersed in an absorbent substrate.

12. An antistatic composition according to claim 11 wherein the substrate is particulate synthetic calcium silicate.

13. An antistatic composition according to claim 11 wherein the substrate is a base bead comprising sodium tripolyphosphate and sodium silicate.

14. A process protecting fabrics against acquiring static electricity during laundering which comprises laundering such fabrics with the composition of claim 6.

15. A process of imparting antistatic properties to fabrics which comprises laundering such fabrics with the composition of claim 11 and a detersive proportion of a detergent.

16. A process for imparting antistatic properties to fabrics which comprises laundering such fabrics in wash water containing a detersive proportion of a detergent composition comprising anionic or nonionic synthetic organic detergent or a mixtue thereof, which wash water contains an effective antistatic amount of an antistatic compound of the formula:

RCONHR' wherein RCO is an acyl of isotearic acid and R' is a saturated or unsaturated aliphatic hydrocarbon chain of 1-18 carbon atoms.

17. A process according to claim 16 wherein the antistatic isostearamide is added to the wash separately from the detergent.

18. A process for imparting antistatic properties to fabrics which comprises contacting such fabrics, in an aqueous medium with an antistatic amount of an antistatic compound of the formula:

RCONHR' wherein RCO is an acyl of isostearic acid and R' is a saturated or unsaturated aliphatic hydrocarbon chain of 1-18 carbon atoms.

19. A process according to claim 18 wherein R' is a saturated primary hydrocarbon chain of 7-18 carbon atoms.

20. A process according to claim 19 wherein the antistatic compound is cocoalkyl isostearamide.

* * * * *